Sept. 19, 1939.  P. E. HAWKINS  2,173,112
UTILITY TRUCK
Filed Aug. 19, 1937   4 Sheets-Sheet 2

INVENTOR
PAUL E. HAWKINS.
BY Geo. B. Fitts
ATTORNEY

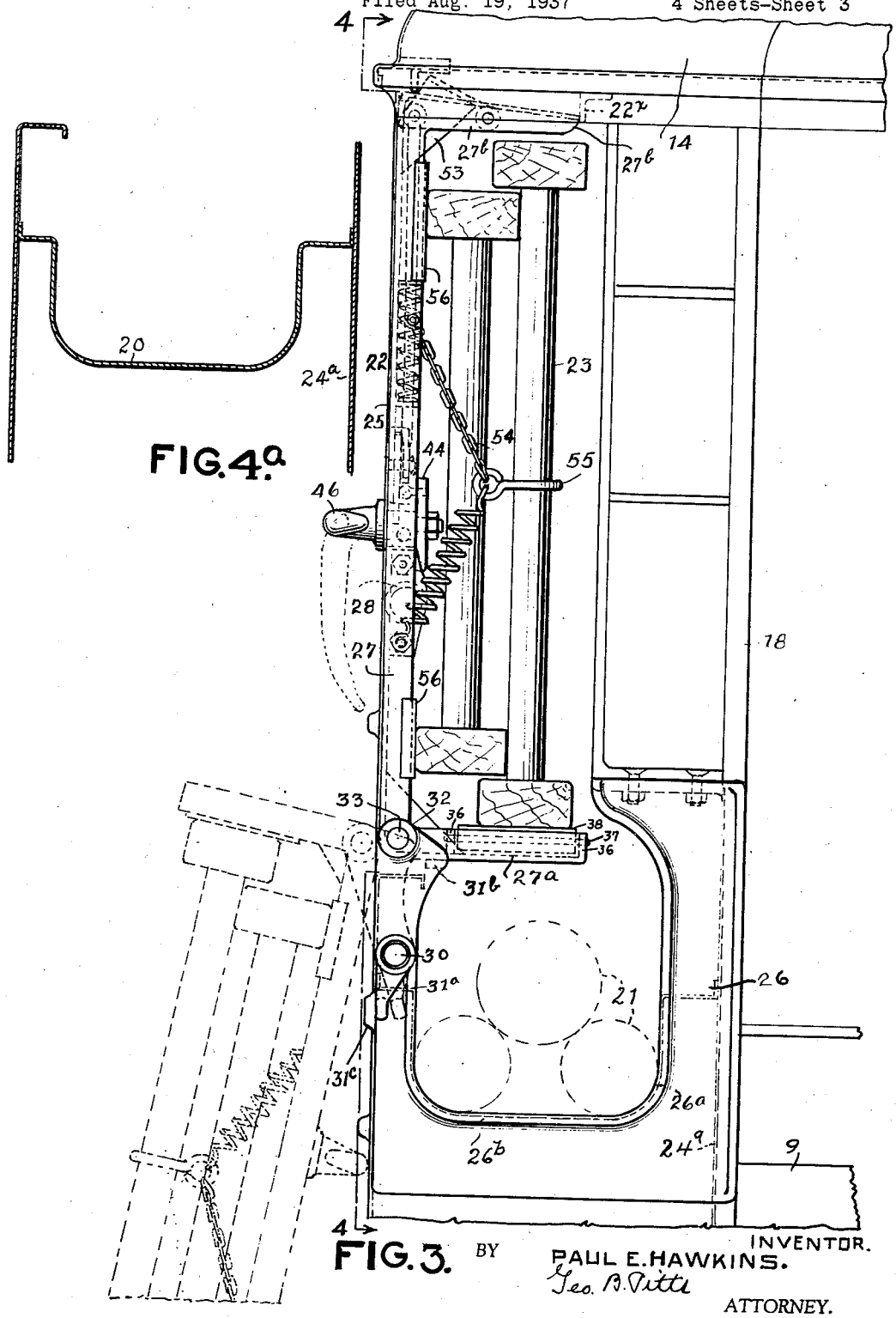

INVENTOR.
PAUL E. HAWKINS.
BY Geo. B. Pitts
ATTORNEY.

Patented Sept. 19, 1939

2,173,112

UNITED STATES PATENT OFFICE 2,173,112

UTILITY TRUCK

Paul E. Hawkins, Lakewood, Ohio, assignor to The Baker-Raulang Company, Cleveland, Ohio, a corporation of Ohio Application August 19, 1937, Serial No. 159,945

16 Claims. (Cl. 296—24)

This invention relates to a power driven truck of the utility type particularly adapted for use by electricians and lineman in connection with the installation, removal and resetting of poles for wires and current conductors, and other equipment and overhead and underground operations relating to the installation of wires and conductors.

One object of the invention is to provide, in a truck of this type, an improved mounting for a ladder whereby it may be positioned on the truck and removed therefrom with great facility, as well as confined within the body, while in transport thereby.

Another object of the invention is to provide, in a truck of this type, an improved carrying support for derrick poles permitting ready handling thereof for storage in or removal from the truck body and reducing danger of damaging the body in the handling of such poles.

Another object of the invention is to provide, in a truck of this type, an improved body construction wherein provision is made to mount and support a ladder and derrick poles within the side walls of the body while permitting both to be handled, when positioned or removed, at the side of the truck or at either end thereof.

Other objects of the invention will be apparent to those skilled in the art to which my invention relates from the following description taken in connection with the accompanying drawings, wherein Fig. 1 is a side elevation of a truck embodying my invention.

Fig. 3 is a fragmentary view of parts shown in Fig. 2, enlarged.

Fig. 4a is a fragmentary section on the line 4a—4a of Fig. 4.

Figure 1:
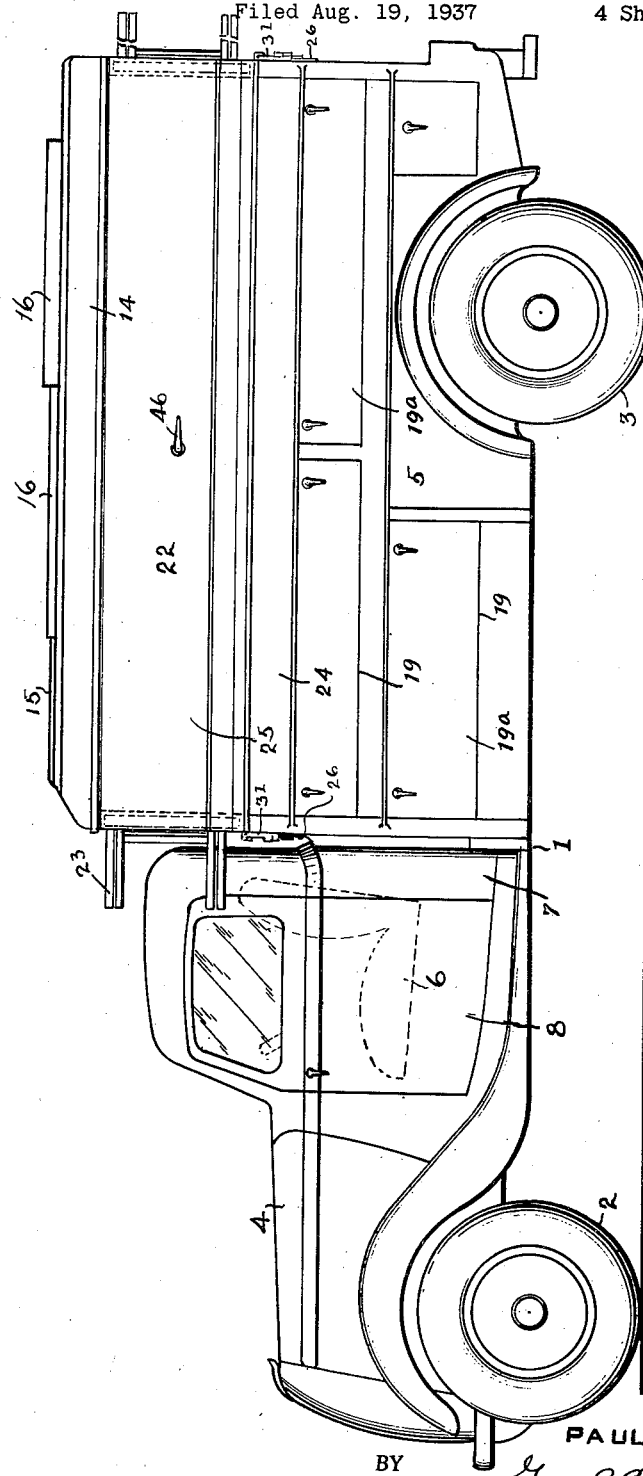

In the drawings, 1 indicates a truck frame of any desired construction, mounted on front steering wheels 2 and rear wheels 3 which are driven from a power mechanism mounted within a hood 4. The rearward portion of the frame supports a body, indicated as an entirety at 5 and forward of the body is a driver's seat 6 and the usual controls for the vehicle, preferably enclosed in a cab 7 having doors 8 at either side, one door only being shown. The body 5 comprises a flooring 9 and housings 10, 10', along either side thereof, a roof 11 mounted on the housings and a front wall 12, formed with an opening 13 (which may be provided with a removable transparent section) to permit rearward vision by occupants in the cab 7. The housings 10, 10', preferably extend from end to end of the platform or flooring 9 and are spaced to provide an aisle and room for various equipment. By preference, the outer walls of the housings are vertical and extend in a plane substantially co-incident with the outer sides of the wheel housings to the roof (see Fig. 2) to insure maximum carrying capacity. The roof 11 consists of side members 14 fixedly mounted on the housings 10, 10', and intermediate sections, the forward roof section 15 being fixed to the side members 14 and front wall 12 and the rearward roof sections 16 being slidable on the side members 14 to a position over the fixed section 15 to provide an opening through the roof to accommodate a derrick and the operating cable therefor, as is customary in carrying out certain operations. The construction of the roof may be substantially similar to that shown in my co-pending application, Ser. No. 45,761.

The housing 10 consists of an upright metal frame 17 of skeleton form, in a portion of which may be incorporated suitable compartments provided with doors fabricated from metal, the remaining portion of the frame on its outer side being covered with sheet metal in the plane of the doors, so that the sheet metal and doors form the exterior wall of the housing.

Figure 2:
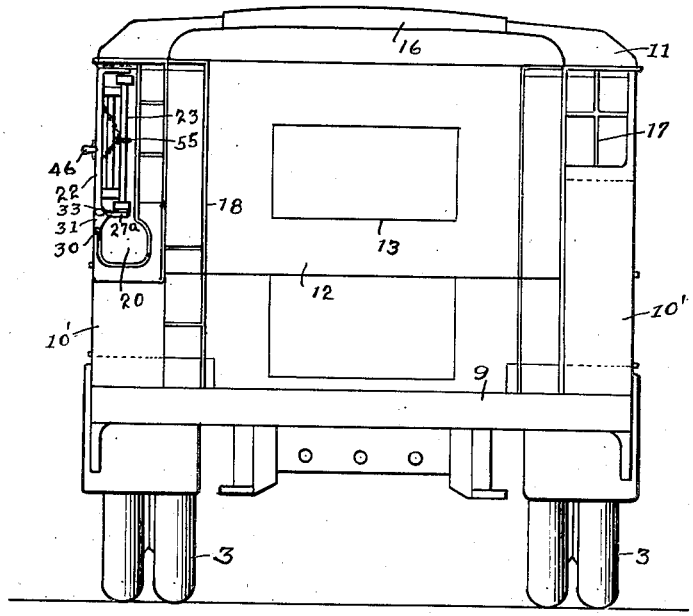
Fig. 2 is a rear end elevation of the truck.
Figure 5:
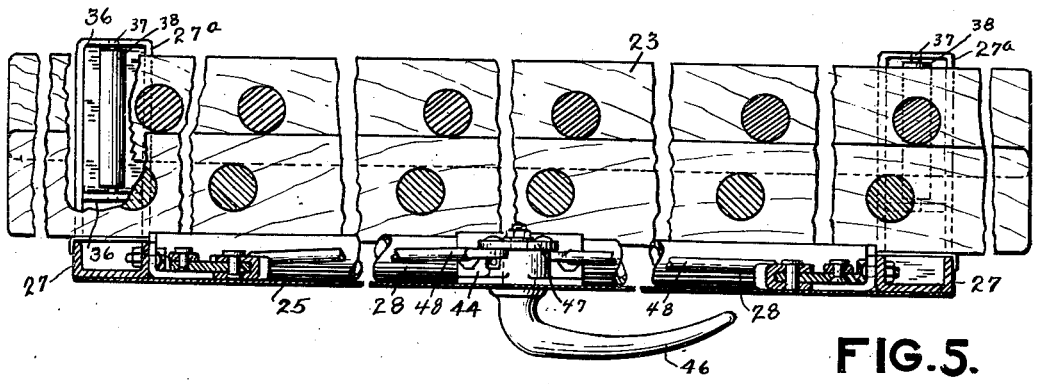
Fig. 5 is a section on the line 5—5 of Fig. 4.

The housing 10' consists of an upright metal frame 18 of skeleton form, in the lower portion of which I preferably incorporate one or a plurality of compartments 19 each provided with a suitable door 19a fabricated from metal. A section of the outer wall of the housing 10' is hinged thereto and adapted to carry on its inner side a ladder so as to eliminate its mounting exteriorly of the body. The hinged section is swingable outwardly and downwardly, so that in such movement of the wall section the ladder is lowered to a position where it may be readily removed and replaced. The swingable wall section may be provided at any desired location below the roof 11, but is preferably adjacent to the roof so as to provide a storing and carrying space for derrick poles at a level which facilitates convenient handling thereof. In the preferred arrangement referred to, I provide above the compartments 19, independently thereof, and between the outer and inner upright members of the frame 18, a channel 20 for derrick poles 21 (shown in dotted lines in Fig. 3) and above the channel 20 I provide a hinged panel, indicated as an entirety at 22, carrying on its inner side a ladder 23, preferably of the extension type. As shown in Figs. 1 and 3, the panel 22 occupies the area between that portion of the frame 18 in which the channel 20 is incorporated and the adjacent side member 14 of the roof and extends from end to end of the housing 10'. That portion of the frame 18 in which the channel 20 is incorporated and the outer side of the panel 22 are faced with sheet metal walls 24, 25, respectively, disposed in the plane of the doors 19a and adjacent portions of the body, when the panel is in normal position, so that these walls, doors and portions of the body, adjacent to the latter, form the exterior wall for the housing 10', as shown in Figs. 1, 2 and 3. As also shown in Figs. 2 and 3, the frame 18 is constructed to accommodate the channel 20 and provide space for the ladder 23.

At the inner and outer ends of the frame 18 I provide castings 26 which are secured to the adjacent upright end members of the frame in any suitable manner. Each casting is substantially U-shape so as to form an opening 26a, in alinement with the opening of corresponding shape in the other casting. The inner side portion of each casting 26 is connected to parts of the frame 18 (see Fig. 3) to form a brace or re-inforcement therefor, whereas the outer side portion of the casting is cut-away to accommodate parts later referred to. The channel 20 extends between the castings 26, being suitably connected at its opposite ends to the walls of the openings 26a in any desired manner. The longitudinal side walls of the channel 20 are suitably connected to the wall 24 and an inner wall 24a, and from end to end it corresponds in shape in cross section to the shape of the lower portions of the openings 26a. Accordingly, the channel 20 is open at its top throughout its length, such opening leading into or merging with the space provided in the frame 18 to accommodate the ladder 23, so that when the panel 22 is swung to its open position (see dotted lines in Fig. 3), the derrick poles 21 may be lowered through this opening into the channel 20 and removed therethrough, if desired. As the channel 20 is open at its opposite ends, it will be seen that the derrick poles may be inserted in the channel and removed therefrom at either end of the body 5 and at the side of the body, as is found most convenient to the operator or dependent upon surrounding conditions. Each casting is provided on its outer side around the opening 26a therein with an integral rib 26b which serves to reinforce the wall of the opening so as to sustain the weight of the derrick poles as well as to eliminate damaging the casting in storing and removing the derrick poles 21.

The panel 22 comprises a frame 22a formed of channel members 27, disposed substantially in alinement with the upright end members of the frame 18 and connected rigidly together by a member 28, the upper and lower ends of each channel member 27 being extended laterally inwardly to form arms or end walls 27a, 27b, between which the ladder 23 is positioned. As shown in Figs. 2, 3, 4 and 5, the ladder rests on the end walls 27a and is held against undue movement vertically by the end walls 27b. The connecting member 28 is preferably of tubular form and provided with flanged ends which are suitably bolted to the channel members 27. The wall 25 is fixed to the channel members 27 in any desired manner. The panel 22 is swingably mounted in the following manner: 29 indicates hollow bosses provided on the inner sides of the castings 26 and supporting stud shafts 30 which project outwardly therefrom. 31 indicates a pair of hinge elements loosely mounted on the stud shafts 30 and provided at the upper ends with hollow bosses 32 in which is fixedly mounted the opposite ends of a shaft 33. The shaft 33 extends through alined openings formed in the channel members 27 and forms the pivot about which the panel 22 swings relative to the hinge elements 31. In swinging the panel 22 to its open position, the hinge elements 31 swing outwardly about the stud shafts 30, so that the pivot or shaft 33 may be disposed outwardly of the body and permit the panel 22 to depend downwardly substantially vertically. The outward movement of the hinge elements 31 is limited by providing them with tail members 31a arranged to engage the ribs 26b, as shown in dotted lines in Fig. 3. In swinging the panel 22 to closed position against stops 22x, the arms or end walls 27a engage lugs 31b extending inwardly from the hinge elements 31 and move the latter with the panel back to normal position, the engagement of the arms 27a with the lugs 31b, when the panel is in normal or closed position serving to prevent outward movement of the hinge elements and the engagement of the tail members 31a with stops 31c (which are preferably formed integrally with the castings 26) serving to limit inward movement of the hinge elements. The adjacent side member 14 of the roof is provided with angles 34, which serve as keepers for a latch mechanism, indicated as an entirety at 35.

Each of the arms 27a is provided with spaced transverse walls 36 for supporting the opposite ends of a shaft 37 on which is loosely mounted a roller 38. As shown in Figs. 2, 3, 4 and 5, the ladder 23 rests on the rollers 38, and as the housing 10' is open at its opposite ends, the ladder may be positioned in or removed from the panel 22 at either end of the body, the rollers 38 facilitating such operation and relieving strains on the frame of the ladder carrying panel 22.

The panel 22 is provided with a counterbalancing means, preferably consisting of two springs 39 each coiled around the shaft 33 and having one end thereof fixed to the adjacent channel member 27 and its opposite end fixed to the shaft 33. As the shaft 33 is fixed by pins 33a to the hinge elements 31, the tension of the springs is exerted clockwise as viewed in Fig. 3. The connection of each spring 39 with the shaft 33 is provided by a flanged collar 40 fixed to the shaft and an adjustable collar 41 to which the adjacent end of the spring 39 is fixed, the collar 41 being formed with a series of openings each arranged to register with an opening 42 formed in the flange of the collar 40, whereby a pin 43 may be projected through the opening 42 into the opening in the collar 41 in registry therewith, to lock the collar 41 to the collar 40 with the adjacent spring 39 under the desired tension.

Figure 6:
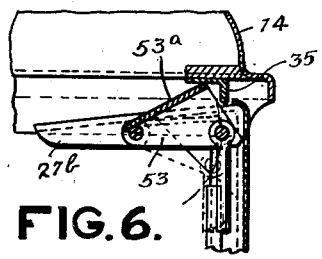
Fig. 6 is a fragmentary section on the line 6—6 of Fig. 4.
Figure 4:
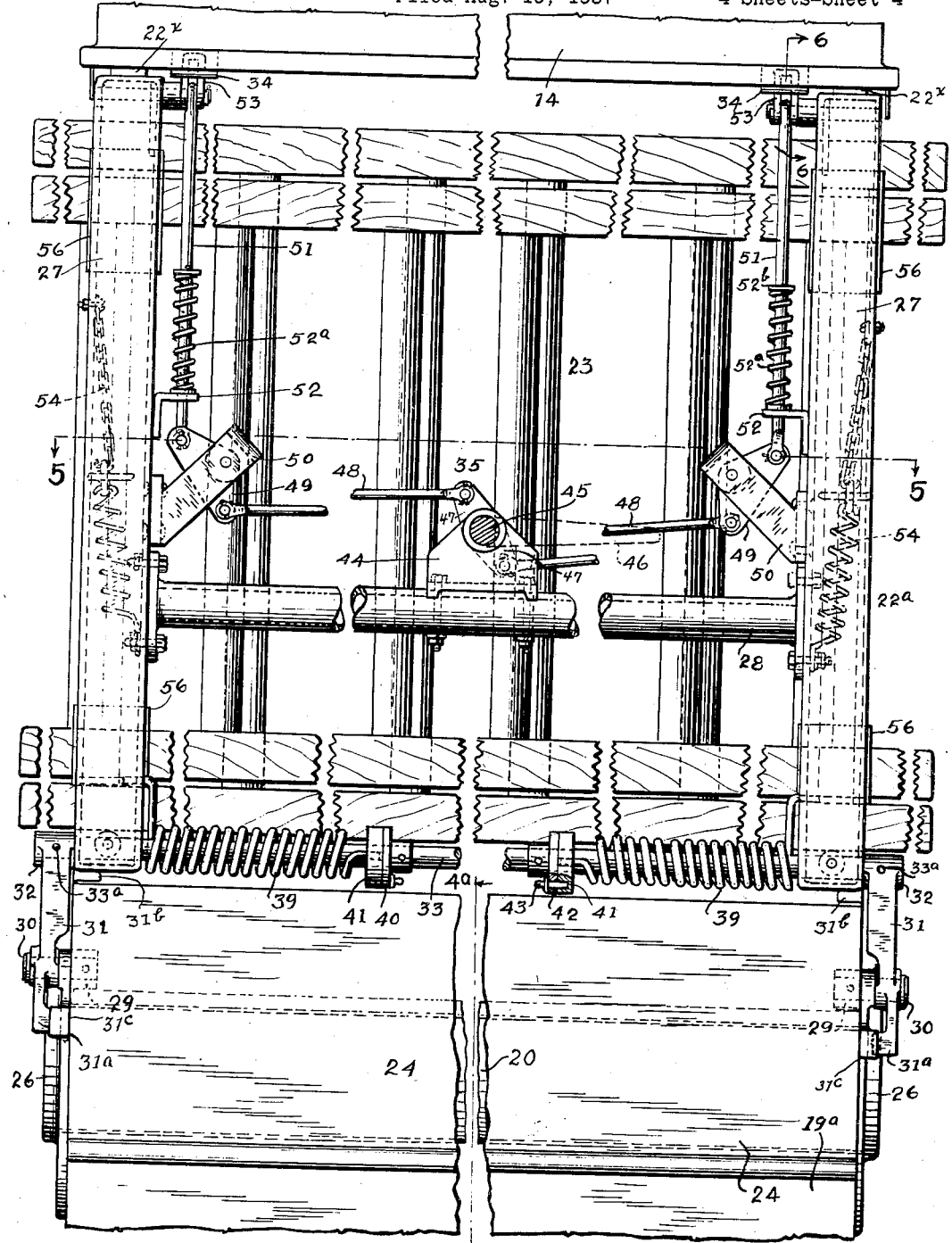
Fig. 4 is a fragmentary side elevation of the body, enlarged; the side wall for the upper portion of the body being omitted to facilitate the illustration.

The latch mechanism 35 comprises the following: 44 indicates a support suitably bolted to the connecting member 28 and formed with a bearing for a shaft 45, which extends through the wall 25 and carries a handle 46. The inner end of the shaft 45 is provided with diametrically disposed wings 47 to which are pivotally connected links 48. The outer end of each link 48 is pivotally connected to one end of a bell-crank 49 fulcrumed on a bracket 50 which is supported on the adjacent channel member 27. The other end of the bell crank 49 is pivotally connected to the lower end of a rod 51. The rod 51, which is slidably and loosely guided for endwise movement in an opening formed in an angle 52, fixed to the adjacent channel member 27, is normally biased upwardly by a coiled spring 52a, interposed between the angle 52 and collar 52b fixed to the adjacent rod. The upper end of the rod 51 is pivotally connected to the outer end of a latch 53 which is pivoted at its inner end on the adjacent arm 27b. The latch is preferably of inverted U-shape, the rod 51 being disposed between and pivoted to its side walls. The front ends of the side walls of the latch 53 are arranged to engage with the keeper 35 (see Fig. 6) to hold the panel 22 in closed position, whereas its bottom wall 53a is adapted to ride the keeper in the closing movement of the panel, the spring 52a being arranged to yield during such movement of the latch.

From the foregoing description it will be seen that the latches 53 are normally held in locking position behind the keepers 35 by the influence of the springs 52a and that both may be retracted simultaneously by operation of the handle 46 to permit opening of the panel 22.

The ladder 23 may be removably clamped to the panel 22 in any desired manner, but by preference I provide on each channel member 27 a pair of connected together flexible members 54 (one of which consists of a coiled expansion spring) carrying a hook 55 which is arranged to engage a rung of the ladder 23, the spring member co-operating with the other member of the pair to normally hold the adjacent rails of the ladder against suitable pads 56 provided on each channel member.

It will be understood that either housing 10, 10', may be provided with a swingable ladder carrying panel.

My construction is advantageous in that provision is made for carrying all equipment within the side walls of the housings, so that outwardly extending projections are eliminated. In the arrangement shown, the derrick poles are carried at a relatively low level, substantially in line with the bottom wall of the cab window, and the ladder is mounted on a swingable support or panel, whereby it may be bodily lowered to a position where it is readily accessible for removal. In view of the fact that provision is made to bodily lower the ladder from its transporting position, when it is to be removed from the housing, and after replacement it is bodily raised or returned to its transporting position, the swingable support for the ladder may conveniently consist of the upper section of the housing side wall, although, as already set forth, such swingable section may be arranged at a lower level when desired. It will also be noted that when the swingable section is moved to its open position, the ladder and all of the derrick poles are accessible at the side of the body. On the other hand, since the housing is open at its opposite ends, this equipment may be removed and replaced at either end thereof.

To those skilled in the art to which my invention relates many changes in construction and widely differing embodiments and applications of the invention will suggest themselves without departing from the spirit and scope of the invention. My disclosures and the description herein are purely illustrative and are not intended to be in any sense limiting.

What I claim is:

1. In a vehicle, the combination with a wheel mounted frame, of a body on said frame and comprising a platform, housings along either side of said platform and having outer side walls, a portion of the side walls of one of said housings from end to end thereof being hinged on said housing to form an outwardly swingable section and means on the inner side of said swingable portion for removably supporting a ladder.

2. In a vehicle, the combination with a wheel mounted frame, of a body on said frame and comprising a platform, housings along either side of said platform and provided with outer side walls, a pair of hinge elements pivotally mounted on one of said housings, hinging means between said elements and that portion of the side wall thereabove to form an outwardly swingable panel, and means on the inner side of said panel for removably supporting a ladder.

3. In a vehicle, the combination with a wheel mounted frame, of a body mounted thereon and comprising a platform, housings along either side of said platform and provided with outer side walls, the upper portion of the side wall of one of said housings from end to end thereof being hinged at its lower edge on said housing to form an outwardly swingable section, and upper and lower devices on the inner side of said section adjacent the opposite ends thereof and extending inwardly therefrom and arranged to removably support the opposite end portions of a ladder, whereby the ladder is carried within the housing.

4. In a vehicle, the combination with a wheel mounted frame, of a body mounted thereon and comprising a platform, housings along either side of said platform and provided with outer side walls, the upper portion of the side wall of one of said housings from end to end thereof being hinged at its lower edge on said housing to form an outwardly swingable section, upper and lower devices on the inner side of said section adjacent the opposite ends thereof and arranged to removably support the opposite end portions of a ladder, whereby the ladder is carried within the housing, and means carried by said section for detachably securing the ladder thereto between said devices.

5. In a vehicle, the combination with a wheel mounted frame, of a body thereon and comprising a platform, housings along either side of said platform and provided with outer side walls and a roof, one of said housings inwardly of its outer side wall being constructed to form a chamber opening through the opposite ends of said housing, a channel extending from end to end of said chamber within the outer side wall of said housing and opening at its top into said chamber, that portion of the side wall between said channel and said roof being hingedly supported to form an outwardly swingable section, which when opened, permits access to said channel, and means on the inner side of said section for supporting a ladder thereon.

6. In a vehicle body provided with a housing consisting of a skeleton frame and compartments incorporated in the lower portion of said frame, the combination of supporting members mounted on said frame at its opposite ends in a plane above said compartments and formed with alined openings, a channel extending between said members and alined with the openings therein, the upper portion of said channel throughout its length being open, a panel normally disposed on the outer side of said frame above and in contiguous relation to said compartments to form the outer wall of said frame above the latter and hinged at its lower end on the outer portions of said supporting members and co-operating with said frame to form a space in communication with said channel, and means on the inner side of said panel for supporting a ladder thereon.

7. In a vehicle, the combination with a wheel mounted frame, of a body thereon and comprising a platform and a housing along one side of said platform, said housing consisting of a skeleton frame, supporting members mounted on said frame at its opposite ends and formed with alined openings, a channel extending through said frame in alinement with said openings and connected at its opposite ends to said members, the upper portion of said channel throughout its length being open for communication with the space in said skeleton frame above said channel, hinge elements carried by the outer portions of said members and arranged to swing outwardly at their upper ends, a panel normally disposed on the outer side of said frame to form the outer wall for the space in said skeleton frame above said channel and hinged at its lower end on the upper ends of said hinge elements, and means on the inner side of said panel for supporting a ladder thereon.

8. In a vehicle, the combination with a wheel mounted frame, of a body thereon and comprising a platform and a housing along one side of said platform, said housing consisting of a skeleton frame, provided with an outer side wall, the upper portion of said side wall being hinged at its lower end on said frame to swing outwardly and co-operating with said frame to form a space and arranged to receive a ladder, means on the inner side of said swingable portion for supporting the ladder thereon, spring operated latch means engaging the opposite end portions of said swingable portion, and an operating device common to said means for releasing them simultaneously.

9. In a vehicle, the combination with a wheel mounted frame, of a body thereon and comprising a platform and a housing along one side of said platform, said housing consisting of a skeleton frame, supporting members mounted on said frame at its opposite ends, hinge elements carried by said members and arranged to swing outwardly at their upper ends, a shaft carried by the upper ends of said hinge elements, a panel on the outer side of said skeleton frame and co-operating therewith to form a space to receive a ladder, and means on the inner side of said panel for supporting the ladder thereon, said panel being hinged at its lower end on said shaft and swingable outwardly and downwardly whereby the ladder thereon is lowered and exposed for removal.

10. In a vehicle, the combination with a wheel mounted frame, of a body thereon and comprising a platform and a housing along one side of said platform, supports mounted on said frame at its opposite ends and formed with alined openings, a channel extending between said supports in alinement with the openings therein, hinge elements carried by the outer walls of said supports and arranged to swing outwardly at their upper ends, a shaft fixedly connected to the upper ends of said hinge elements, a panel hinged at its lower end on said shaft and co-operating with said frame to form a space in communication with said channel and arranged to receive a ladder, means on the inner side of said panel for supporting a ladder thereon, and a spring between said shaft and said panel normally tending to counterbalance the latter.

11. In a vehicle, the combination with a wheel mounted frame, of a body thereon and comprising a platform and a housing along one side of said platform and consisting of a frame having an outer sectional side wall, the upper portion of which forms with the frame a space opening through the opposite ends of the housing, a channel open at its top and extending through said space from end to end of said housing and arranged to form the bottom wall for said space, the upper section of said side wall being hingedly supported on said housing to permit access to said channel when swung to open position.

12. In a vehicle, the combination with a wheel mounted frame, of a body on said frame and comprising a platform, housings along either side of said platform and having outer side walls and a roof, the lower portion of one housing having compartments incorporated in it, the portion of the outer side wall of said housing between said compartments and said roof from end to end of said housing being hinged thereto to form a swingable section adapted to support on its inner side within the housing a ladder.

13. In a vehicle, the combination with a wheel mounted frame, of a body on said frame and comprising a platform, a housing along one side of said platform and provided with an outer side wall, a pair of hinge elements pivotally mounted on said housing, hinging means between said elements and that portion of the side wall thereabove to form a swingable panel adapted to support on its inner side within the housing a ladder, and means to limit the swinging movement of said hinge elements.

14. In a vehicle, the combination with a wheel mounted frame, of a body on said frame and comprising a platform, a housing along one side of said platform and provided with an outer side wall, a pair of hinge elements pivotally mounted on said housing and arranged to swing outwardly, hinging means between said elements and that portion of the side wall thereabove to form a swingable panel adapted to support on its inner side within the housing a ladder, and means on said elements arranged to be engaged by said panel in its closing movement to swing said elements inwardly.

15. In a vehicle, the combination with a wheel mounted frame, of a body on said frame and comprising a platform, a housing along one side of said platform and provided with an outer side wall, a pair of hinge elements pivotally mounted on said housing and arranged to swing outwardly, means for limiting the swinging of said elements outwardly and inwardly, hinging means between said elements and that portion of the side wall thereabove to form a swingable panel adapted to support on its inner side within the housing a ladder, and devices on one of said elements arranged to be engaged by said panel when in closed position to prevent outward movement of said elements.

16. A utility vehicle comprising a wheel mounted frame, housings along either side thereof having outer side walls and a roof, the upper portion of the outer side wall for one of said housings being hinged along its lower edge to the lower portion of said outer side wall to swing outwardly and downwardly, and means on one side of said hinged portion of said side wall for removably supporting a ladder thereon.

PAUL E. HAWKINS.